(12) United States Patent
Busch et al.

(10) Patent No.: US 8,483,013 B2
(45) Date of Patent: Jul. 9, 2013

(54) SUBMARINE ANTENNA

(75) Inventors: Rainer Busch, Oldenburg (DE); Kai Wicker, Bremen (DE)

(73) Assignee: Atlas Elektronik GmbH, Bremen (DE)

( * ) Notice: Subject to any disclaimer, the term of this patent is extended or adjusted under 35 U.S.C. 154(b) by 556 days.

(21) Appl. No.: 12/742,556

(22) PCT Filed: Sep. 18, 2008

(86) PCT No.: PCT/EP2008/007792
§ 371 (c)(1),
(2), (4) Date: Sep. 7, 2010

(87) PCT Pub. No.: WO2009/062565
PCT Pub. Date: May 22, 2009

(65) Prior Publication Data
US 2010/0329083 A1     Dec. 30, 2010

(30) Foreign Application Priority Data
Nov. 12, 2007   (DE) .......................... 10 2007 053 801

(51) Int. Cl.
*G10K 11/168*     (2006.01)
(52) U.S. Cl.
USPC ........................................................ 367/173
(58) Field of Classification Search
USPC ................................................ 367/141, 173
See application file for complete search history.

(56) References Cited

U.S. PATENT DOCUMENTS

| | | |
|---|---|---|
| 4,390,976 A | 6/1983 | Eynck |
| 4,982,385 A | 1/1991 | Eynck |
| 5,499,219 A * | 3/1996 | Brenner et al. ............... 367/151 |
| 2009/0190442 A1 | 7/2009 | Busch et al. |
| 2010/0329083 A1* | 12/2010 | Busch et al. .................. 367/141 |

FOREIGN PATENT DOCUMENTS

| | | |
|---|---|---|
| DE | 3834669 | 1/1998 |
| DE | 102006060795 B3 * | 12/2007 |
| DE | 102004037987 | 11/2008 |
| DE | 102007053801 B3 * | 12/2008 |
| EP | 0654953 | 5/1995 |
| GB | 1370422 | 10/1974 |

* cited by examiner

*Primary Examiner* — Daniel Pihulic
(74) *Attorney, Agent, or Firm* — Fitch, Even, Tabin & Flannery, LLP

(57) ABSTRACT

The invention relates to a submarine antenna to be attached to the hull of a submarine, said antenna comprising a planar converter arrangement (15) which extends along the hull (11) when attached and which has a reflector (21) and a plurality of electroacoustic converter elements (20). Said converter elements are arranged next to and interspaced from each other and are arranged in front of the reflector (21) in the sound incidence direction. The aim of the invention is to optimize said lateral antenna for attachment to the submarine in terms of its weight and volume and signal-to-disturbance ratio. According to the invention, the reflector (21) is subdivided across the entire length of the converter arrangement (15) into reflector zones (212, 211) that lie one beneath the other and that have a reflection behavior tuned to receive frequency bands of different frequency ranges, the receive frequency band from the highest frequency range being associated with the top reflector zone (212) when attached and the receive frequency band from the lowest frequency range being associated with the bottom reflector zone (211).

9 Claims, 3 Drawing Sheets

SUBMARINE ANTENNA

The invention relates to an underwater antenna for fitting to the hull of a submarine, according to the precharacterizing clause of claim 1.

A known underwater antenna (DE 38 34 669 A1), which is known as a flank antenna or flank array, has a transducer arrangement, which is arranged at a distance from a pressure casing of a submarine, having a multiplicity of hydrophones which are arranged one behind the other in one or more rows along the pressure casing and are at a distance from one another, and a reflector which is arranged behind the hydrophones in the sound incidence direction and is designed on the spring-and-mass principle. The hydrophones are held on the reflector by means of a clamping structure, and the reflector is mounted on the hull wall by sprung elements, via a damping layer. The sprung elements are designed for the impact, oscillation and shock loads that occur.

The directional characteristic of a flank antenna such as this has a main lobe with a narrow beam angle in the horizontal direction, and an extremely wide beam angle in the vertical direction.

One known flat antenna (DE 10 2004 037 987 A1) is composed of a plurality of antenna elements like panels. Each antenna element has an acoustically transparent plastic mount like a panel, in which 6×6 hydrophones, which are arranged in rows in columns, and an inflexible panel, which acts as a reflector and is arranged behind the hydrophones in the sound incidence direction, are embedded. A flat antenna such as this which is designed for receiving antennas, in the medium to relatively high frequency range has a good back-to-front ratio. As a result of the capability to additively combine the output signals from the hydrophones which are located one above the other vertically in the columns when the antenna is in the installed position, the flat antenna also has good beamforming in the vertical reception area, and therefore a relatively good signal-to-noise ratio. The achievement of the good back-to-front ratio for reception frequencies in the low frequency range as well results in the reflector having to have a high mass which, in the case of quite long flank antennas, leads to the flank antenna having a weight which is unacceptable for a submarine.

The invention is based on the object of designing a flank antenna for a submarine which complies with the weight and installation volume constraints that are governed by the submarine, has a good signal-to-noise ratio even in the vertical reception area, and allows sufficiently good surveillance of the sea area, even in the area a long distance from the submarine.

According to the invention, the object is achieved by the features in claim 1.

The underwater antenna according to the invention has the advantage that, by splitting the reflector into reflector areas which are located one above the other with a different width along the hull and are matched to reception frequency bands in different frequency ranges, the horizontal beam angle of a directional characteristic which is formed by the transducer elements in the transducer arrangement remains unchanged and is dependent only on the frequency and antenna length of the entire transducer arrangement, while in contrast the vertical beam angle of the directional characteristic varies from one reflection area to another because of the differently matched reflection behaviour and the different vertical width of the reflector areas. Signals received by the transducer elements in a reflector area which is matched to a specific reception frequency band are at considerably higher levels than signals received by the transducer elements in the adjacent reflector area, which is matched to a different reception frequency band, so that the width of the respectively matched reflector area governs the size of the vertical beam angle, since only those transducer elements which are arranged in it contribute to the formation of the directional characteristic. The uppermost reflector area, which is preferably located somewhat below half the height of the hull, has the greatest width in order to ensure the smallest vertical beam angle of the directional characteristic in the highest reception frequency band, and therefore in particular in the near area, in order to provide good masking of interference sound from the water surface.

In the case of a reflector design such as this, the upper reflector area provides good vertical beamforming of the directional characteristic of the underwater antenna and therefore substantial freedom from interference in the short and medium range areas, which is of particular importance for attacking approaching torpedoes by means of effectors, so-called antitorpedo torpedoes, fired from the submarine. Since the size of the vertical beam angle of the directional characteristic is virtually insignificant for freedom from interference in the far area, which can be accessed only with the low-frequency part of the transducer arrangement, the major aspect of the design of the lower area of the transducer arrangement and the corresponding matching of the reflector area is the weight that is acceptable for fitting to the submarine and the physical volume of the underwater antenna, which is matched to the installation area, which is predetermined by the submarine. High-quality underwater antennas with a low false alarm rate are normally designed such that the transducer arrangement has a good back-to-front ratio. For this purpose, appropriate installation of the reflector and maintenance of a defined distance between the transducer elements and the reflector ensure that, on the one hand, useful sound coming from in front is reflected by the reflector onto the transducer elements, and interference sound coming from behind is screened, and on the other hand that no interference occurs between the directly incident useful sound and the useful sound reflected by the reflector. The back-to-front ratio is dependent on the frequency range of the transducer arrangement and, for low reception frequencies, this results in the reflector having a large mass and in there being a long distance between the transducer elements and the reflector. Since the low-frequency range of the transducer arrangement is now kept considerably smaller in comparison to the medium-to-high-frequency range by the reflector areas having different widths in the vertical direction of the transducer arrangement, it is possible, without any deterioration in the tactical quality of the underwater antenna for the far area, for the considerably greater reflector mass that is required for the low-frequency range of the transducer arrangement—and therefore the total weight of the underwater antenna which is influenced significantly by the reflector mass—to be kept relatively low. Since the low-frequency area is located at the bottom while the underwater antenna is in the installed position, a sufficiently large physical space is available for accommodation, when the underwater antenna is in the installed position and because of the curvature of the hull, for the lower area of the transducer arrangement which, because of the greater required distance between the transducer elements and the reflector, has a greatly increased physical depth in the sound incidence direction, without the underwater antenna projecting beyond a side vertical boundary line on the hull, which boundary line is defined by a vertical tangent to the hull.

Expedient embodiments of the underwater antenna according to the invention together with advantageous developments and refinements of the invention are specified in the further claims.

According to one advantageous embodiment of the invention, two reflector areas which are located one above the other are provided with preset transducer elements which are each matched to reception frequency bands, the mid-frequencies differ by a power of ten, wherein the width of the lower reflector area is approximately one sixth, and the width of the upper reflector area is approximately five sixths, of the overall width, seen in the vertical direction in the installed position, for example on a submarine, of the reflector. A split such as this on the one hand allows sufficiently good beamforming of the directional characteristic in the vertical direction, while on the other hand keeping the weight of the underwater antenna within acceptable limits for a submarine.

The invention will be described in more detail in the following text with reference to one exemplary embodiment, which is illustrated in the drawing, in which.

Figure 1:
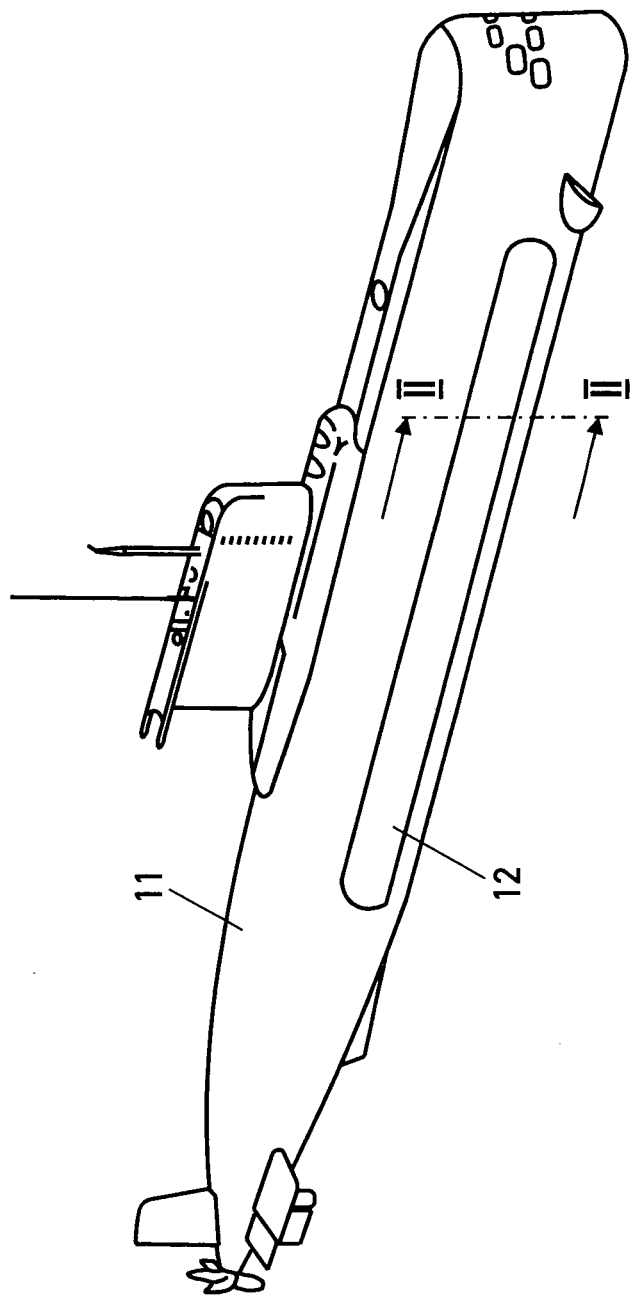
FIG. 1 shows a perspective view of a submarine with flank antennas.

FIG. 1 shows a perspective illustration of a submarine, on whose hull 11 an underwater antenna 12 which extends in the longitudinal direction of the hull 11, also referred to as a flank antenna or flank array, is in each case arranged both on the starboard side and on the port side. Only the underwater antenna 12 on the starboard side can be seen in FIG. 1.

Figure 2:
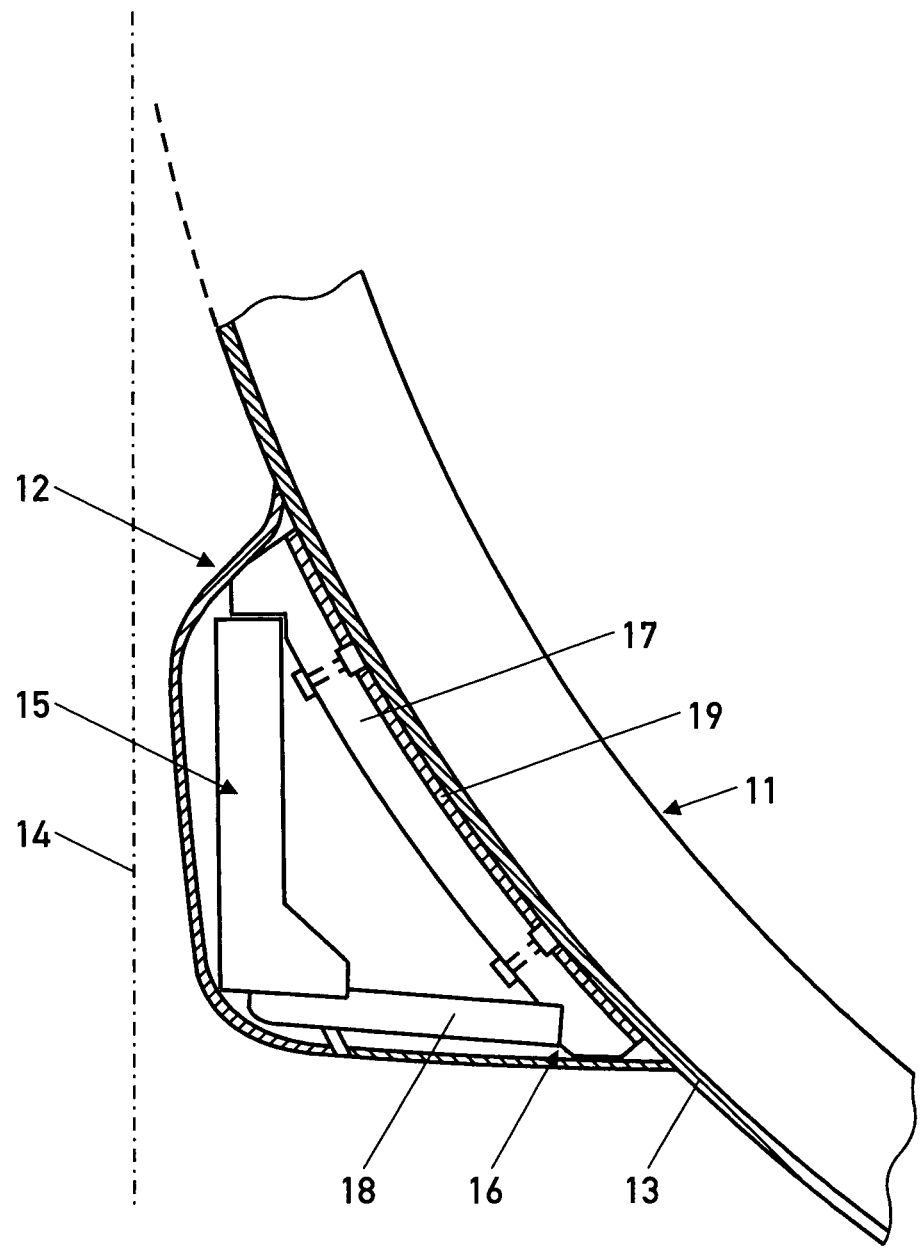
FIG. 2 shows a section through a flank antenna along the line II-II in FIG. 1, with a transducer arrangement, a mount and a casing body.

As can be seen from the enlarged section illustration in FIG. 2, the underwater antennas 12 are mounted on the wall 13 of the hull 11 below the greatest horizontal width of the hull 11, and are designed such that they remain behind a boundary line 14 which can be described by a vertical tangent applied to the hull 11. Both underwater antennas 12 have the same physical design, so that only the underwater antenna 12 on the starboard side, as sketched in FIGS. 1 and 2, will be described in the following text.

The underwater antenna 12 has a transducer arrangement 15 which extends along the hull 11 in the installed position, a mount 16 to which the transducer arrangement 15 is attached, and a casing body 17 which surrounds a transducer arrangement 15 and the mount 16, is composed of acoustically transparent material, and is attached to the mount 16 and/or to the wall 13 of the hull 11 itself. The illustration in FIG. 2 shows, in the form of a section, only the casing body 17 and the wall 13 of the hull 11, while the mount 16 and the transducer arrangement 15 can be seen in the form of a side view. The mount 16 is positioned on the hull so that the transducer arrangement 15 is located, aligned vertically, in a sector area of the hull 11 whose sector axis includes an angle in the order of magnitude of 30° with a horizontal running through the axis of the hull 11. The mount 16 preferably has a strut structure with basic struts 17 and supporting struts 18. The supporting struts 17 are attached to the wall 13 of the hull 11 via a damping layer 19 which absorbs bending waves. The supporting struts 18 are fixed on the one hand to the basic struts 17 and on the other hand to the transducer arrangement 15, and are aligned such that they include an obtuse angle with the transducer arrangement 15, which is aligned vertically in the installed position. The supporting struts 18 act with the bottom on the transducer arrangement 15, while the upper end of the transducer arrangement 15 is attached to the basic struts 17.

Figure 3:
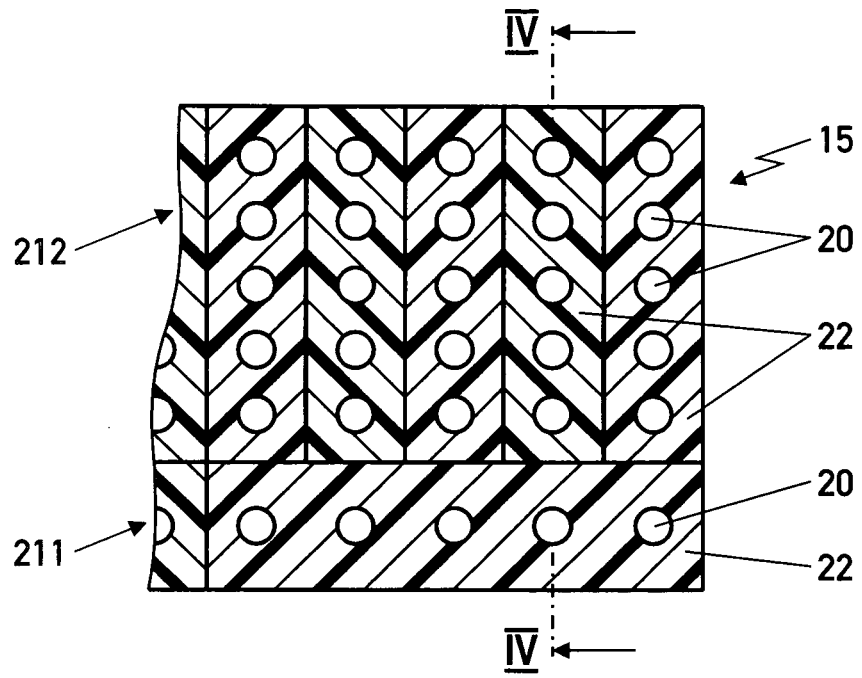
FIG. 3 shows a section, in the form of a detail, through the transducer arrangement of the underwater antenna, along the line III-III in FIG. 2.
Figure 4:
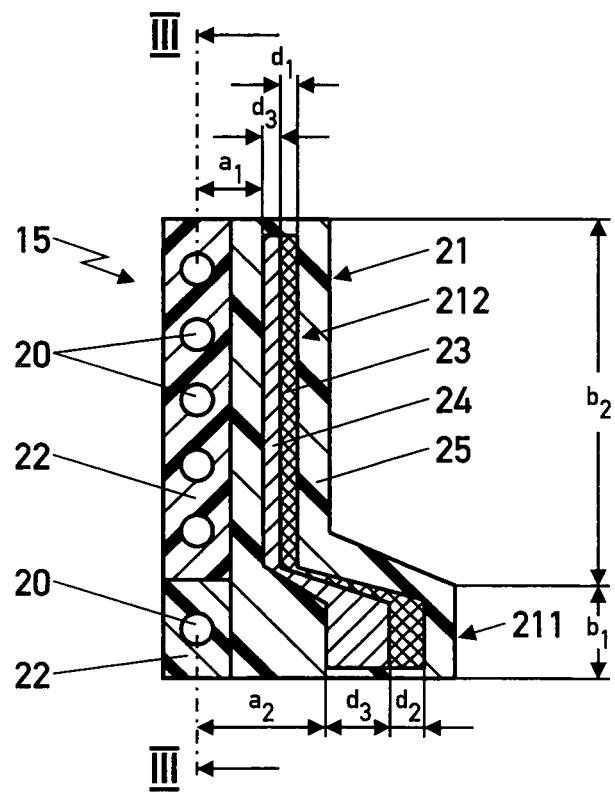
FIG. 4 shows a section along the line IV-IV in FIG. 3.

The transducer arrangement 15, which is shown schematically in the form of various section illustrations in FIGS. 3 and 4, has a multiplicity of transducer elements 20, also referred to as hydrophones, which are arranged on one plane, and a reflector 21 which is arranged behind the transducer elements 20 in the sound incidence direction. The transducer elements 20 are arranged in one or more rows, one behind the other and one above the other at a distance from one another, thus resulting in parallel transducer element rows which extend both in the longitudinal direction of the transducer arrangement 15 and transversely to it (approximately vertically in the installed position). The lateral extent of the transducer arrangement 15, which is referred to in the following text as the width, is considerably less than the length of the transducer arrangement 15. In the exemplary embodiment of the transducer arrangement 15 as illustrated in FIGS. 3 and 4, five transducer elements 20 are in each case arranged one above the other vertically in a row. Each row of transducer elements 20 is enclosed in a stave 22 composed of acoustically transparent material, for example polyurethane. A multiplicity of such staves 22 are arranged alongside one another. The sixth transducer elements 20 in each row are likewise enclosed in a stave 22, in groups of five transducer elements each. A plurality of the last-mentioned staves 22 are arranged one behind the other in the longitudinal direction of the transducer arrangement 15. All the staves 22 are mounted on the reflector 21, arranged in a row. Alternatively, a plurality of parallel rows of transducer elements 20 can be integrated in a flat element, which is in the form of a panel and is composed of acoustically transparent material. A plurality of such flat elements are then placed adjacent to one another and are mounted on the reflector 21. The design of a flat element in the form of a panel such as this and with transducer elements 20 is described in DE 10 2004 038 033 B3 (FIG. 3 and Claim 7).

As can be seen from the schematic section illustration in FIG. 4, the reflector 21 is in the form of a mass-and-spring system and has a panel 23, which reflects/carries sound poorly, and a mass panel 24, which rests on that surface of the panel 23 which reflects/carries sound poorly, but points in the sound incidence direction. The panel 23 which reflects/carries sound poorly is an elastic soft-material panel, for example composed of polyurethane foam, while the mass panel is produced from steel, lead or scrap lead. The two panels 23, 24, which rest on one another, are completely enclosed in a hard encapsulation 25 composed of acoustically transparent material, preferably of polyurethane. The hard encapsulation 25 also defines the distance between the mass panel 24 and the transducer elements 20.

The transducer arrangement 15 is designed such that a small area, which is a lower area in the installed position, of the transducer arrangement 15 is designed for reception frequencies in the low-frequency range, and a considerably larger area, which is an upper area in the installed position, of the transducer arrangement 15 is designed for reception frequencies in the medium to higher frequency range. Each of the two areas extends over the entire length of the transducer arrangement 15. For this aspect of the design of the transducer arrangement 15, the reflector 21 is subdivided into two reflector areas 211 and 212, with a different width $b_1$, $b_2$. The reflection behaviour of each of the reflector areas 211, 212 is matched to one reception frequency band from the two frequency ranges. The reception frequency bands are chosen such that their mid-frequencies differ, for example, by a power of 10. The reflection behaviour of the lower reflector area 211 is matched to the mid-frequency of the reception frequency band in the low-frequency range, and has the smaller width $b_1$, as seen in the vertical direction, which in the exemplary embodiment is about 1/6 of the overall width. In the exemplary embodiment, a single row of transducer elements 20, which extends in the longitudinal direction, is arranged in front of the lower reflector area 211. The reflection behaviour of the upper reflector area 212 is matched to the mid-frequency of the reception frequency band in the medium to high frequency range, and has the greater width $b_2$, which in the exemplary embodiment is about 5/6 of the overall width of the reflector 21. In the exemplary embodiment, five rows of transducer elements 20 are arranged in front of this reflector area 212. In order to match the reflection behaviour of the reflector 21 to the reception frequency bands, the two reflector areas 211, 212 have different depths when seen in the sound incidence direction, which depths are governed by the thicknesses of the panel 23 which reflect/carries sound poorly and the mass panels 24, as well as by the distance between the transducer elements 20 and the mass panel 24.

In the exemplary embodiment shown in FIG. 4, the thickness of the panel 23 which reflects/carries sound poorly is denoted by $d_1$ in the upper reflector area 212 and by $d_2$ in the lower reflector area 211. The thickness of the mass panel 24 in FIG. 4 is annotated with $d_3$ in the upper reflector area 212 and with $d_4$ in the lower reflector area 211. The distance between the reflector 21 and the transducer elements 20 in FIG. 1 is annotated with $a_1$ for the upper reflector area 212 and with $a_2$ for the lower reflector area 211. As can immediately be seen from FIG. 4, the thickness $d_2$ of the panel 23 which reflects/carries sound poorly and the thickness $d_4$ of the mass panel 24 in the lower reflector area 211 are considerably greater than the thickness $d_1$ of the panel 23 which reflects/carries sound poorly and the thickens $d_2$ of the mass panel 24 in the upper reflector area 212. By way of example, the thickness $d_1$ and the thickness $d_2$ are each chosen to be 4 mm, and the thickness $d_3$ is chosen to be 15 mm, and the thickness $d_4$ to be 30 mm. As can likewise be seen from FIG. 4, the distance $a_2$ between the mass panel 24 and the plane of the transducer elements 20 is considerably greater in the lower reflector area 211 than the distance $a_1$ relating to this in the upper reflector area 212. The two distances $a_1$ and $a_2$ are once again governed by the different mid-frequencies of the two reception frequency bands, and are designed such that no disturbing interference occurs between directly incident useful sound and useful sound that has been reflected by the reflector 21 onto the transducer elements 20.

The invention claimed is:

1. Underwater antenna for fitting to the hull of a submarine, having a transducer arrangement (15) which, in the installed position, extends along the hull (11), extends over an area, has a multiplicity of electroacoustic transducer elements (20), in particular hydrophones, which are arranged at a distance alongside one another and one above the other, and has a reflector (21) which is arranged behind the electroacoustic transducer elements (20) in the sound incidence direction and has a length which extends over all the transducer elements (20) which are arranged alongside one another and a width which extends over all the transducer elements (20) which are arranged one above the other, characterized in that the reflector (21) is in the form of a spring-and-mass system with a panel (23) which reflects/carries sound poorly, preferably an elastic soft material panel, and having a mass panel (24) which rests on that surface of the panel (23) which reflects/carries sounds poorly but faces in the sound incidence direction, and is preferably composed of steel or lead, in that the reflector (21) is subdivided into reflector areas (211, 212) which are located one above the other, have a length which extends over the length of the reflector (21) and have a width ($b_1$, $b_2$) which increases from the lowest to the highest reflector area (211, 212) and whose reflection behaviour is matched to the reception frequency bands from different frequency ranges, such that the thickness of the reflector (21) and the distance between the reflector (21) and the transducer elements (20) which are arranged in front of it in the respective reflector area (211, 212) is matched to the mid-frequency of the reception frequency band associated with the respective reflector area (211, 212), wherein, in order to associate the reception frequency band from the highest frequency range with the reflector area (212) which is highest in the installed position, the thickness of the reflector (21) and its transducer element separation are smallest in the uppermost reflector area (212), and in order to associate the reception frequency band from the lowest frequency range with the reflector area (211) which is lowest in the installed position, the thickness of the reflector (21) and its transducer element separation are greatest in the lowermost reflector area (211).

2. Underwater antenna according to claim 1, characterized in that two reflector areas (211, 212) which are located one above the other are provided, in that the mid-frequencies of the reception frequency bands which are associated with the reflector areas (211, 212) differ by a power of ten, and in that the width ($b_1$) of the lower reflector area (211) is approximately one sixth, and the width ($b_1$) of the upper reflector area (212) is approximately five sixths, of the width of the entire reflector (21).

3. Underwater antenna according to claim 2, characterized in that the thicknesses ($d_2$, $d_1$ and $d_4$, $d_3$) of both the panel (23) which reflects/carries sound poorly and of the mass panel (24) are considerably greater in the lower reflector area (211) than in the upper reflector area (212).

4. Underwater antenna according to claim 3, characterized in that the thickness ($d_1$ or $d_2$) of the panel (23) which reflects/carries sound poorly is in the single-digit millimeter range in the upper reflector area (212), preferably at 4 mm, and is in the two-digit millimeter range, preferably at 15 mm, in the lower reflector area (211).

5. Underwater antenna according to claim 3, characterized in that the thickness ($d_3$ or $d_4$) of the mass panel (14) is in the single-digit millimeter range in the upper reflector area (212), preferably at 4 mm, and is in the two-digit millimeter range, preferably at 30 mm, in the lower reflector area (211).

6. Underwater antenna according to claim 2, characterized in that the distance ($a_2$, $a_1$) between the mass panel (24) and the transducer elements (20) in the lower reflector area (211) is considerably greater than in the upper reflector area (212).

7. Underwater antenna according to claim 1, characterized in that the reflector (21) is enclosed in an acoustically transparent hard encapsulation (25), preferably composed of polyurethane, and in that the rows of transducer elements (20) which are arranged next to one another are enclosed in staves (22) which are located on one another and are composed of acoustically transparent material, preferably polyurethane.

8. Underwater antenna according to claim 1, characterized in that the transducer arrangement (15) is arranged on a mount (16), and the mount (16) is designed to be fitted to the hull (11) such that, when fitted, the transducer arrangement (15) is aligned vertically in a sector area of the hull (11) whose sector axis, which bisects the sector angle, includes an angle in the order of magnitude of 30° with a horizontal running through the axis of the hull (11), and in that the transducer arrangement (15) is set back with respect to a tangent, which runs at right angles to the horizontal, to the hull (11).

9. Underwater antenna according to claim 8, characterized in that the mount (16) has supporting struts (18), which act in the area of the lower end of the transducer arrangement (15) and are supported on the hull (11), which are inclined at an obtuse angle to the vertically aligned transducer arrangement (15).

* * * * *